US012001028B2

(12) United States Patent
Wang et al.

(10) Patent No.: US 12,001,028 B2
(45) Date of Patent: Jun. 4, 2024

(54) SPECKLE-SUPPRESSING LIGHTING SYSTEM

(71) Applicant: THE TRUSTEES OF DARTMOUTH COLLEGE, Hanover, NH (US)

(72) Inventors: Xiaoxin Wang, Hanover, NH (US); Charles J. Carver, Jr., Hanover, NH (US); Eric R. Fossum, Hanover, NH (US); Jifeng Liu, Hanover, NH (US); Xia Zhou, Hanover, NH (US); Nicholas R. Shade, Hanover, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 17/953,129

(22) Filed: Sep. 26, 2022

(65) Prior Publication Data

US 2023/0100241 A1 Mar. 30, 2023

Related U.S. Application Data

(60) Provisional application No. 63/247,949, filed on Sep. 24, 2021.

(51) Int. Cl.
*G02B 27/48* (2006.01)
*F21V 8/00* (2006.01)

(52) U.S. Cl.
CPC .......... *G02B 27/48* (2013.01); *G02B 6/0006* (2013.01); *G02B 6/0008* (2013.01)

(58) Field of Classification Search
CPC .. G02B 6/0047; G02B 6/0028; G02B 6/0006; G02B 6/0068
See application file for complete search history.

(56) References Cited

U.S. PATENT DOCUMENTS

| | | | | |
|---|---|---|---|---|
| 7,298,940 | B2 * | 11/2007 | Abu-Ageel | G02B 27/0927 362/558 |
| 7,379,651 | B2 * | 5/2008 | Abu-Ageel | G02B 27/0994 372/99 |
| 7,672,041 | B2 * | 3/2010 | Ito | G02B 6/264 359/332 |
| 2005/0254019 | A1 * | 11/2005 | Magarill | G02B 27/0927 348/E5.143 |
| 2005/0286123 | A1 * | 12/2005 | Abu-Ageel | G02B 6/136 359/443 |
| 2006/0239006 | A1 * | 10/2006 | Chaves | G02B 6/0073 257/E33.071 |
| 2019/0032886 | A1 * | 1/2019 | Daicho | C01F 17/34 |

* cited by examiner

*Primary Examiner* — Robert J May
(74) *Attorney, Agent, or Firm* — Cozen O'Connor

(57) ABSTRACT

A speckle-suppressing lighting system includes an optical waveguide, a first solid-state light source, a second solid-state light source, and a diffuser. The optical waveguide has a proximal end and a distal end. At least part of the diffuser is between the proximal end and the distal end. The first solid-state light source is optically coupled to the optical waveguide near the proximal end, and emits a first light beam that propagates toward the distal end and has a first center wavelength. The second solid-state light source is optically coupled to the optical waveguide near the proximal end, and emits a second light beam that propagates toward the distal end and has a second center wavelength differing from the first center wavelength. The diffuser diffuses the first light beam and the second light beam.

14 Claims, 10 Drawing Sheets

SPECKLE-SUPPRESSING LIGHTING SYSTEM

CROSS-REFERENCE TO RELATED APPLICATIONS

This application claims the benefit of U.S. Provisional Application No. 63/247,949, filed on Sep. 24, 2021, the disclosure of which is incorporated herein by reference in its entirety.

GOVERNMENT RIGHTS

This invention was made with government support under Grant No. 1955180 awarded by the National Science Foundation. The government has certain rights in the invention.

BACKGROUND

Lighting accounts for 15% of global electricity consumption and 5% of worldwide greenhouse gas emissions. A significant rise in lighting demand is projected in coming decades due to population growth and increased urbanization. The global transition from incandescent bulbs to highly efficient light-emitting diode (LED) lamps could save electricity consumption and avoid billions of metric tons of $CO_2$ emissions per year. Compared to traditional incandescent light bulbs, LED lamps use 75% less energy and last 25 times longer. However, white LEDs suffer from the well-known efficiency droop as the electrical current increases, and the Stokes shift loss when the pump light is converted to the phosphor light. These factors limit the wall-plug efficiency of typical white LEDs to less than or equal to 25%.

To address the efficiency and cost challenges of white LEDs, laser-based white light is very promising for general lighting due to its higher efficiency at high power (>40% wall-plug efficiency at 1-2 W without efficiency droop) and high power density (several orders of magnitude higher than LEDs). This technology is expected to double the efficiency of existing LED lighting system and further reduce the power consumption and $CO_2$ emission by half in the lighting sectors. Laser-based white light can also find applications in the fields of laser projectors and visible light communications.

Similar to its LED counterpart, phosphor conversion and color mixing are two major schemes to achieve laser-based white light. The use of phosphors, particularly consisting of rare earth elements, hinders the cost reduction and limit the range of achievable color temperatures and illumination levels. Stability and reliability are additional concerns when phosphor is submitted high temperature/light intensity stress from laser clusters. Furthermore, the inherent slow recombination/decay time of the phosphors (on the scale of microseconds) limits the data transmission speed of phosphor-converted white light below <1 Gb/s.

Use of color mixing for generating laser-based white light is a straightforward approach that combines different wavelength lasers. The transmission speed is determined by discrete lasers and modulation schemes. Laser mixing for white light illumination faces a major challenge: speckle, a random interference pattern formed when laser (coherent light) is scattered, resulting in non-uniform distribution of light intensity.

SUMMARY OF THE EMBODIMENTS

For practical lighting application, the speckle noise should be suppressed below the human perception limit without significantly sacrificing laser efficiency. So far, the development of speckle reduction technology mainly relies on the costly optics for temporal speckle averaging, such as rotating diffraction gratings/microlens arrays and dynamic deformable mirrors. Their mechanical systems require external power and are typically slow and cumbersome, unsuitable for next generation white laser lamps. Embodiments disclosed herein reduce speckle without the above-mentioned disadvantages.

In a first aspect, a speckle-suppressing lighting system includes an optical waveguide, a first solid-state light source, a second solid-state light source, and a diffuser. The optical waveguide has a proximal end and a distal end. At least part of the diffuser is between the proximal end and the distal end. The first solid-state light source is optically coupled to the optical waveguide near the proximal end, and emits a first light beam that propagates toward the distal end and has a first center wavelength. The second solid-state light source is optically coupled to the optical waveguide near the proximal end, and emits a second light beam that propagates toward the distal end and has a second center wavelength differing from the first center wavelength. The diffuser diffuses the first light beam and the second light beam.

DETAILED DESCRIPTION OF THE EMBODIMENTS

Figure 1:
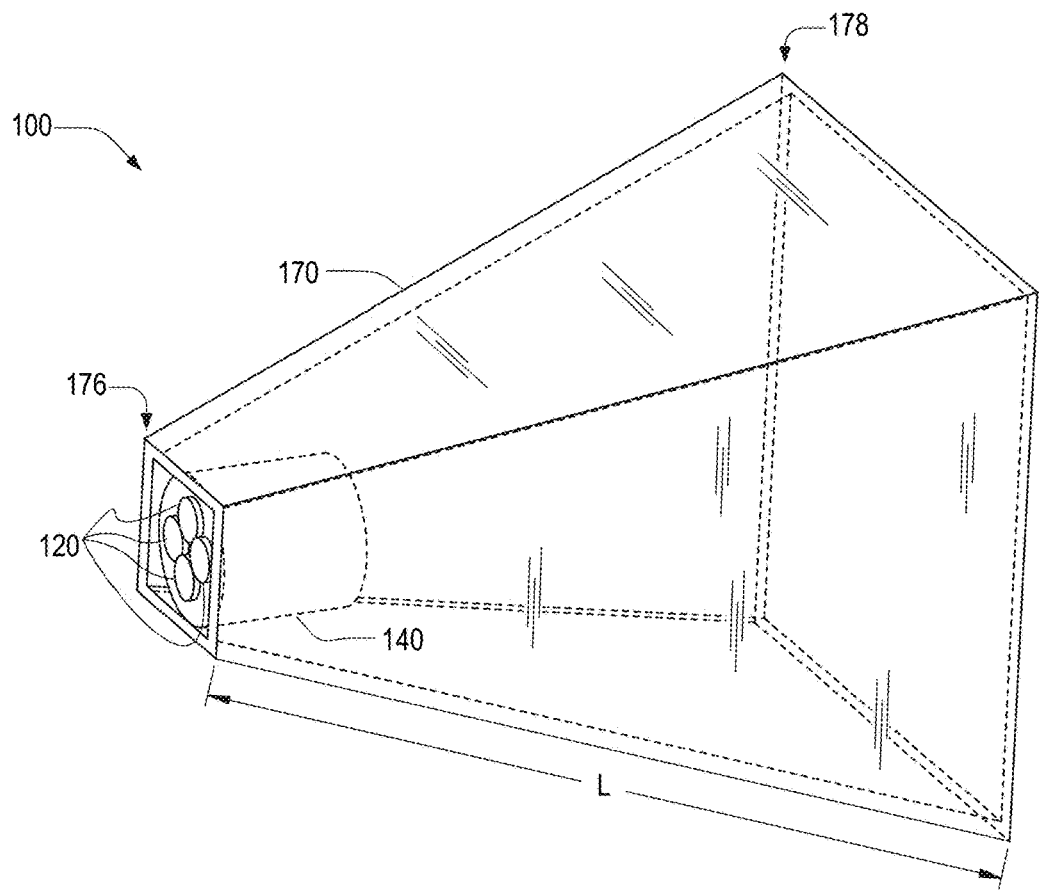
FIGS. 1-4 schematically show embodiments of a speckle-suppressing lighting system that includes sources directly above/on the mixing diffuser rod.

FIG. 1 is a schematic of a speckle-suppressing lighting system 100, hereinafter lighting system 100. FIGS. 2-6 are respective schematics of speckle-suppressing lighting systems 200, 300, 400, 500, and 600, each of which is an example of lighting system 100. Lighting systems 100-400 include laser sources directly above or on a mixing diffuser rod. Lighting systems 500 and 600 include optical waveguides that couple laser sources to a mixing diffuser rod.

Lighting system 100 includes a plurality of light sources 120, a diffuser rod 140, and an optical waveguide 170. Each light source 120 may include a laser. Optical waveguide 170 has a proximal end 176 and a distal end 178. Lighting system 100 may include one or more optical elements at distal end 178, such as a total internal reflection (TIR) lens and a diffuser plate.

Each light source 120 is optically coupled to optical waveguide 170 at proximal end 176. Lighting system 100 may include optical waveguides that couple light sources 120 to proximal end 176.

Optical waveguide 170 may be hollow or solid. At least part of diffuser rod 140 may be within optical waveguide 170, e.g., embedded within waveguide 170 when waveguide 170 is solid.

Figure 2:
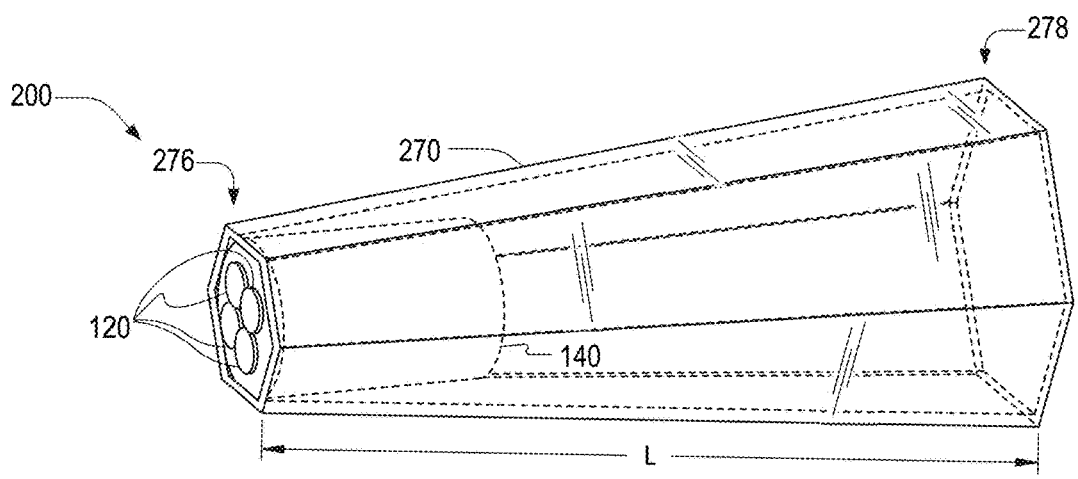

Speckle-suppressing lighting system 200, FIG. 2, is an example of lighting system 100 that includes an optical waveguide 270, which is an example of optical waveguide 170. Waveguide 270 has a hexagonal transverse cross-section, a proximal end 276, and a distal end 278.

Figure 3:
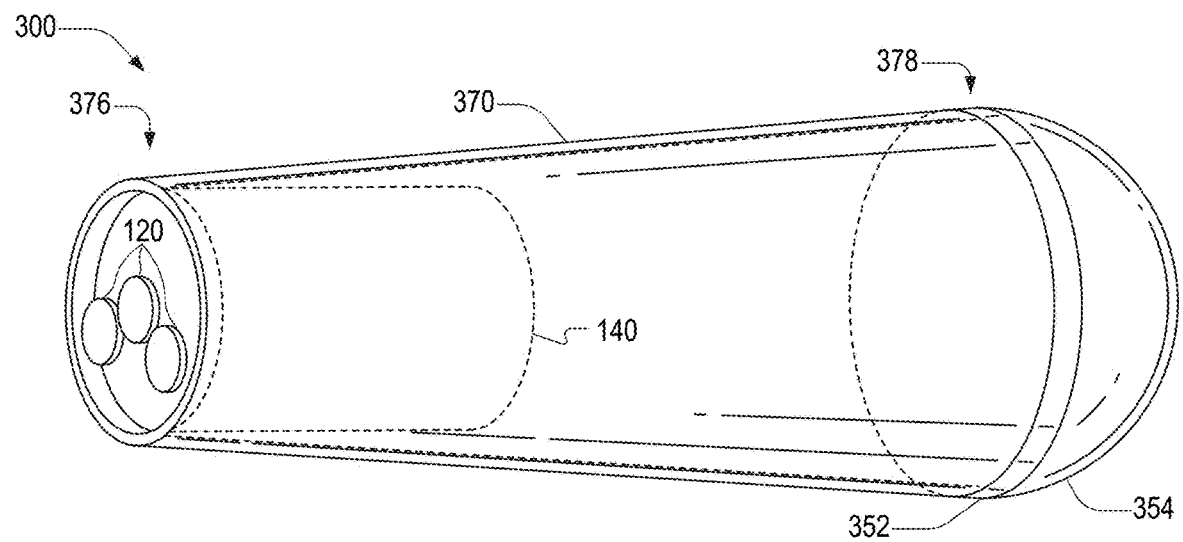

Speckle-suppressing lighting system 300, FIG. 3, is an example of lighting system 100 that includes an optical waveguide 370, which is an example of optical waveguide 170. Optical waveguide 370 has an elliptical transverse cross-section, which in embodiments is circular. Waveguide 370 has a proximal end 376 and a distal end 378. Lighting system 300 includes at least one of a diffuser plate 352 and a TIR lens 354 at distal end 376, which respectively diffuse and refract light that exits lighting system 300 at distal end 376.

Figure 4:
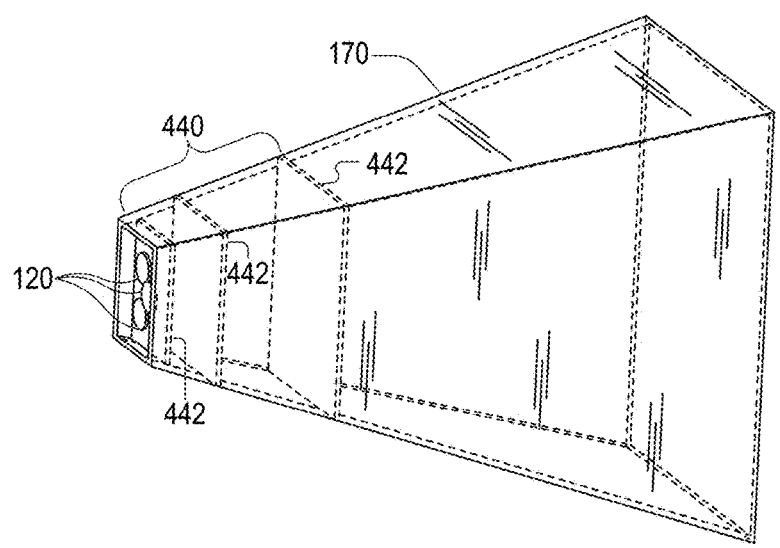

Speckle-suppressing lighting system 400, FIG. 4, is lighting system 100 that includes a diffuser-plate array 440 instead of diffuser rod 140. Diffuser-plate array 440 includes at least one diffuser plate 442 within optical waveguide 170. Diffuser-plate array 440 performs the same function as diffuser rod 140. While diffuser-plate array is illustrated to include three diffuser plates 442, diffuser-plate array 440 may include fewer than or more than three diffuser plates 442 without departing from the scope hereof.

Figure 5:
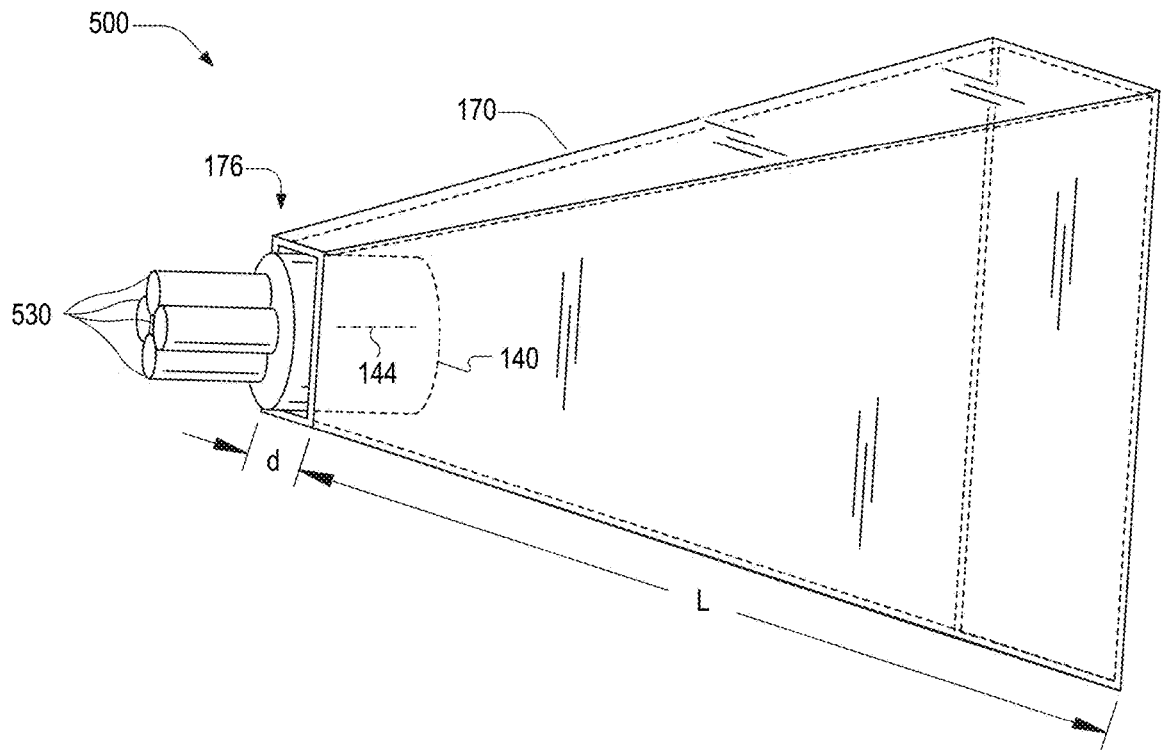
FIGS. 5 and 6 schematically show some embodiments a speckle-suppressing lighting system that light pipes to guide laser light toward the mixing diffuser rod.
Figure 6:
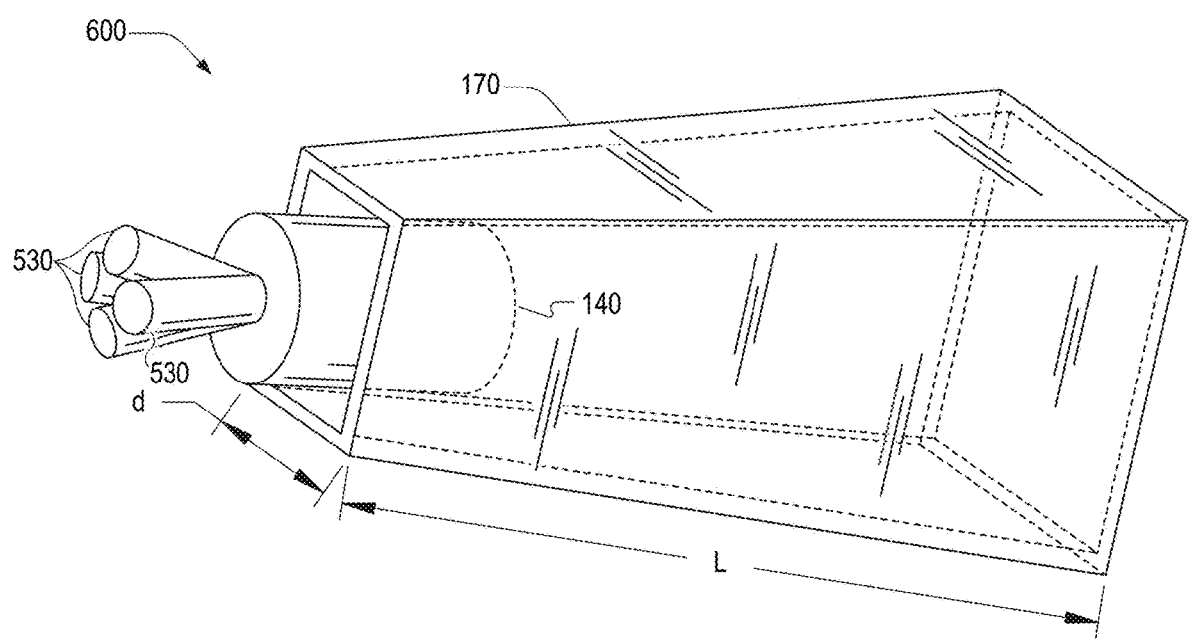

Speckle-suppressing lighting system 500, FIG. 5, is lighting system 100 with the addition of optical waveguides 530, each of which couples a respective light source (e.g., light source 120) to optical waveguide 170 at proximal end 176. Examples of optical waveguides 530 include light pipes and optical fibers.

Diffuser rod 140 has a longitudinal axis 144. The optical axis of optical waveguides 530 may be parallel to longitudinal axis 144, as shown in FIG. 5. The angle between longitudinal axis 144 and each optical waveguide 530 (as defined by its optical axis) may range from zero degrees (parallel) to forty-five degrees. In embodiments, e.g., depending on the geometry of optical waveguide 170, deviating from zero degrees improves mixing and increases coupling efficiency. For example, in lighting system 600, FIG. 6, this angle is fifteen degrees. Either of lighting systems 500 or 600 may include diffuser-plate array 440 instead of diffuser rod 140, where the effective longitudinal axis is an axis perpendicular to respective surfaces of diffuser plates 442.

Figure 7:
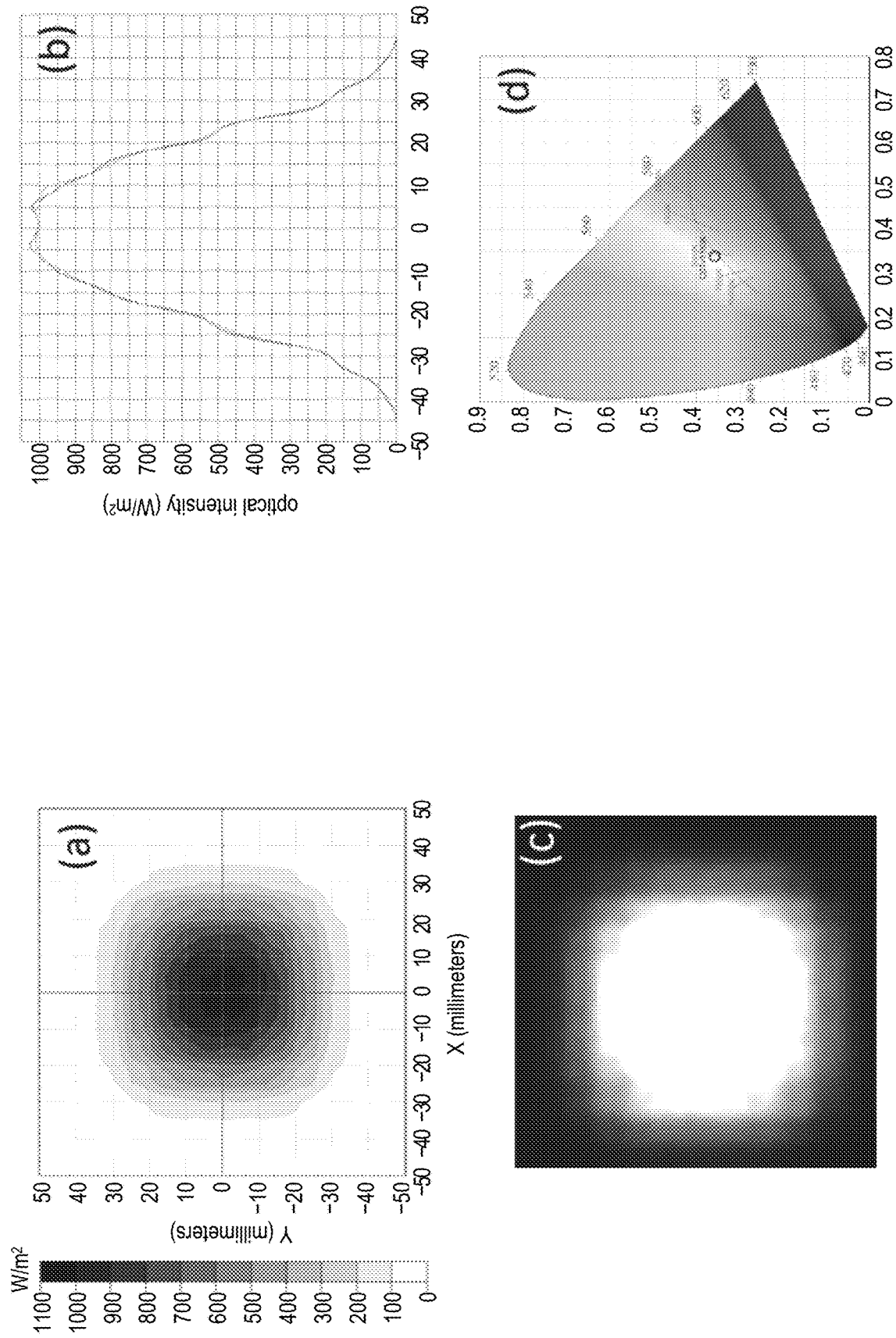
FIGS. 7-12 exhibit ray-tracing simulations of embodiments of a speckle-suppressing lighting system.
Figure 8:
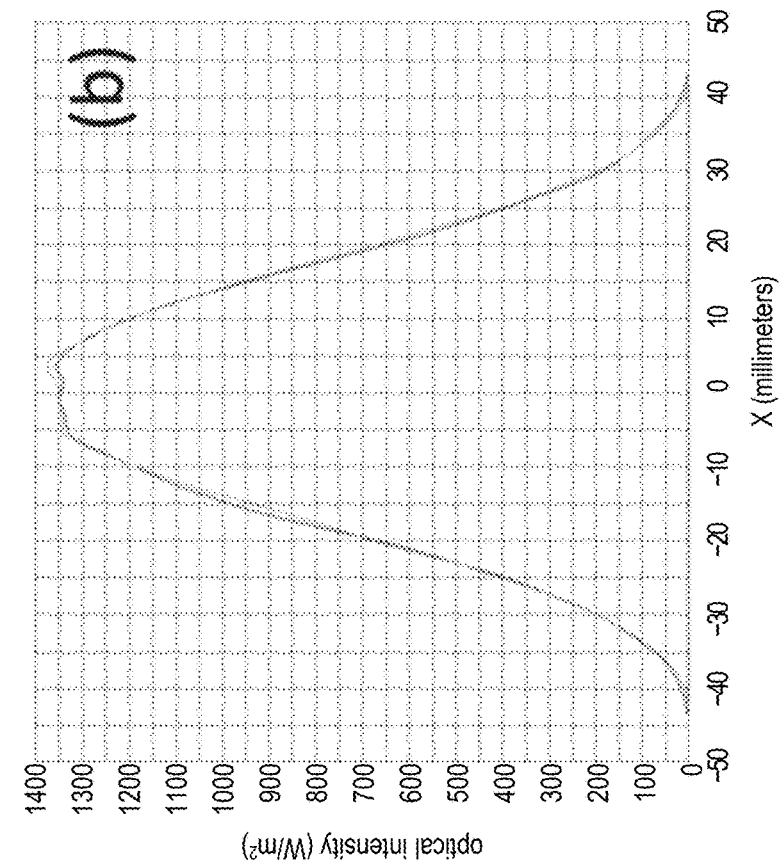
Figure 8:
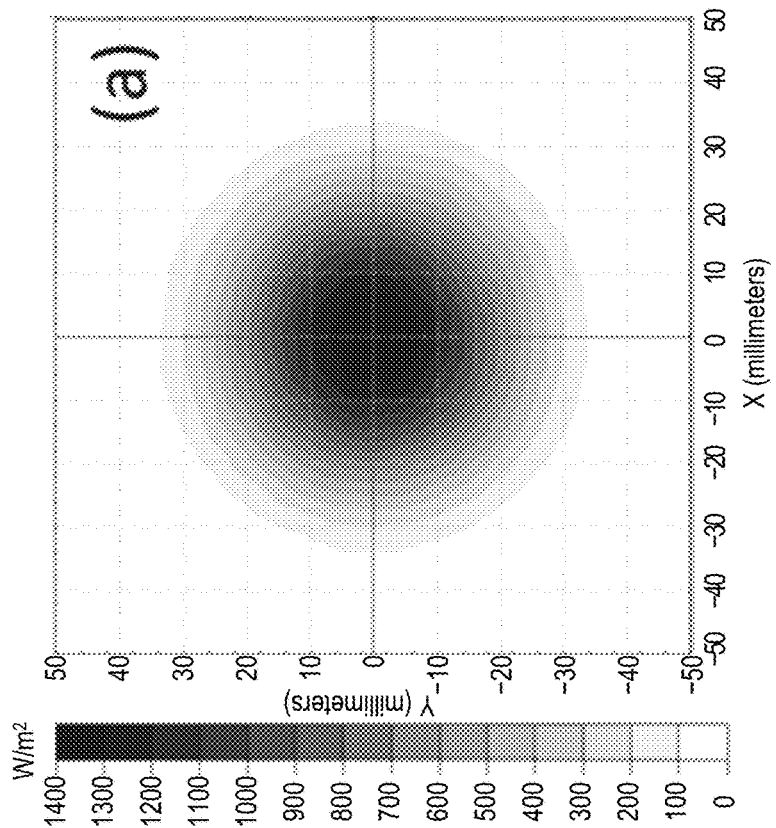
Figure 9:
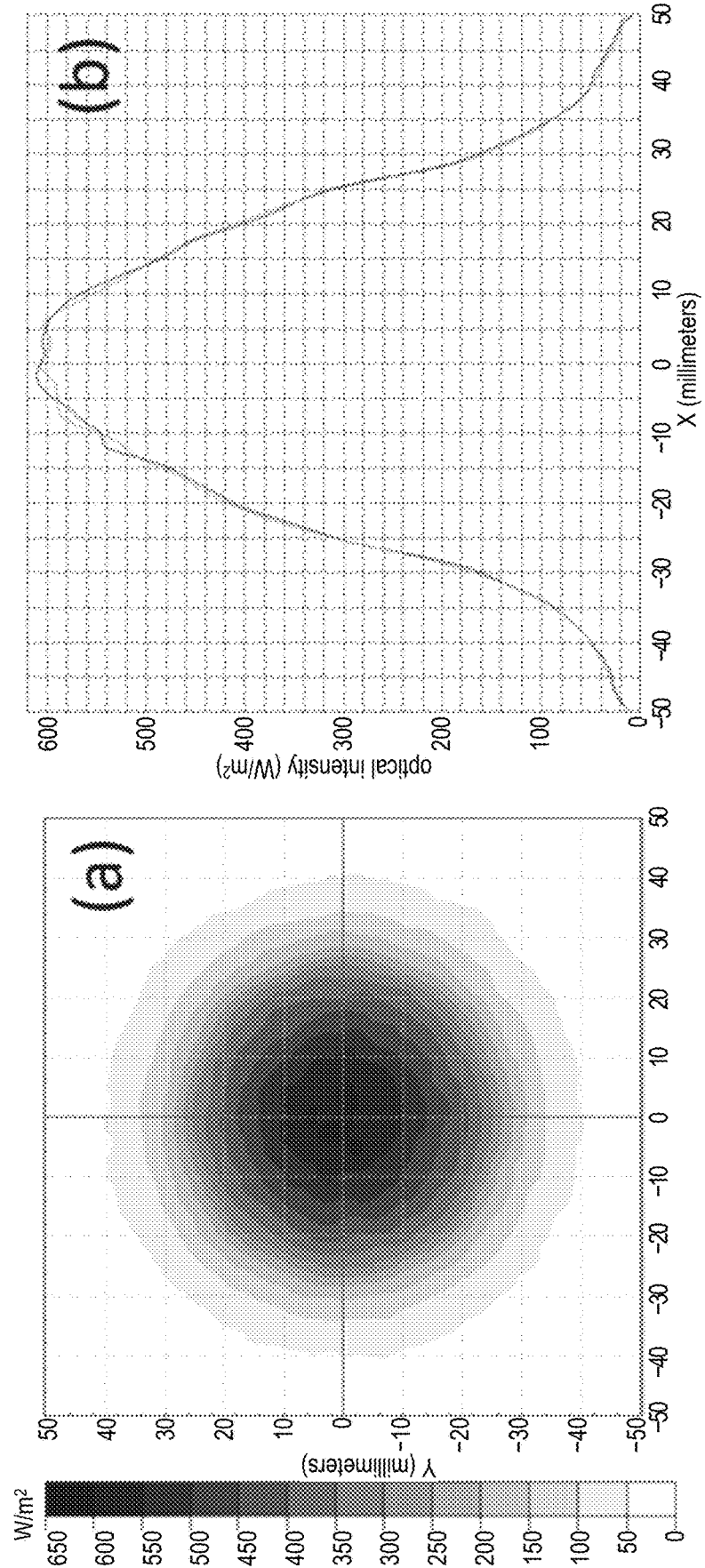

FIGS. 7-12 exhibit ray-traces generated by TracePro® software. FIG. 7 shows (a) an irradiance map, (b) an optical intensity distribution in the horizontal and vertical directions, (c) true color, and (d) color temperature at distal end 178 as generated by TracePro® for an embodiment of lighting system 100. FIGS. 8 and 9 show (a) an irradiance map, and (b) optical intensity distribution in the horizontal and vertical directions at distal end 278 as generated by TracePro® for optical waveguide 270, FIG. 2. The light-source simulated to produce FIG. 8 includes mirror-like reflective internal walls. The simulated light source of FIG. 9 employs white diffusing coating on internal walls of optical waveguide 170.

Figure 10:
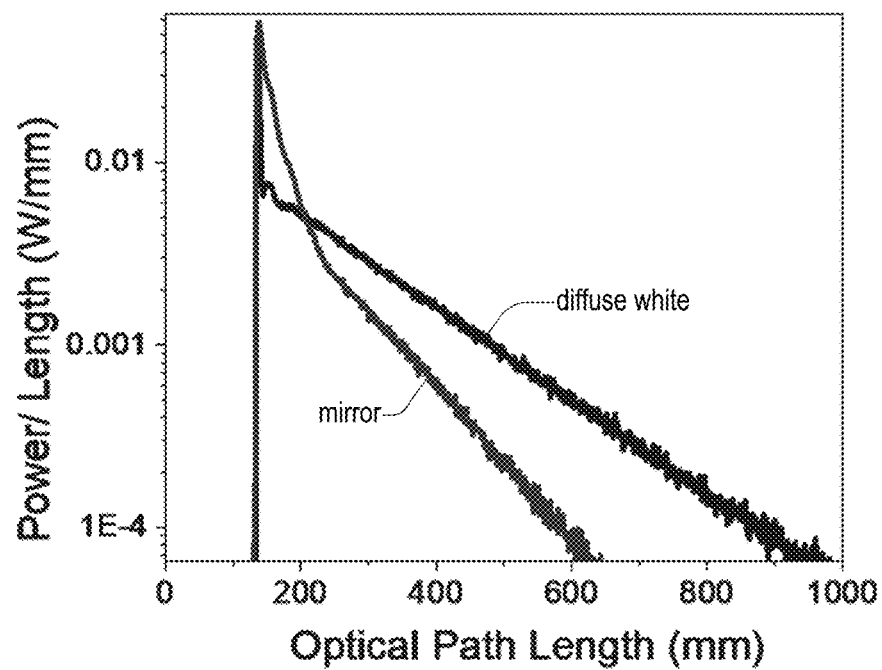

FIG. 10 is a graph comparing the power/length as a function of the optical path length, revealing the multi-reflection and multi-scattering scenarios in the cases of mirror-like internal walls of optical waveguide 170 (FIG. 8) and diffuse white coated (FIG. 9) internal walls of optical waveguide 170 (FIG. 9).

Figure 11:
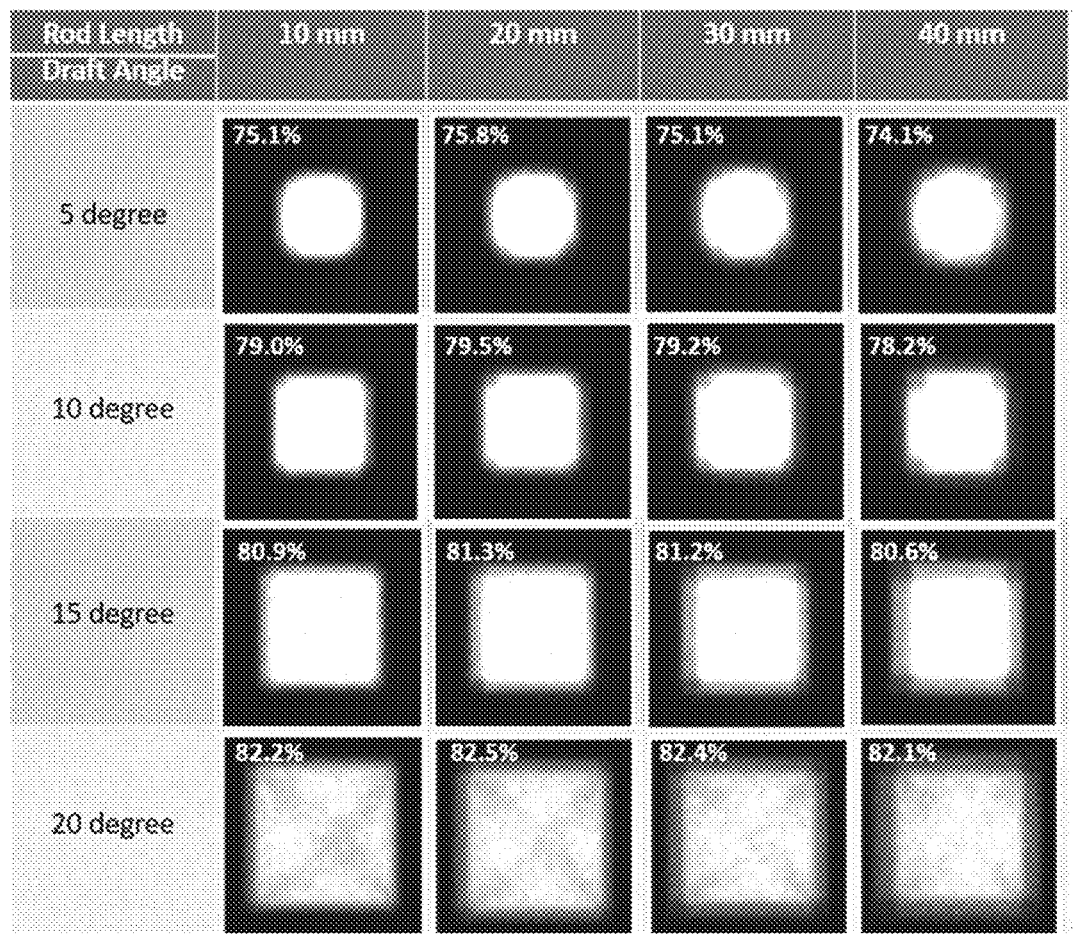
Figure 12:
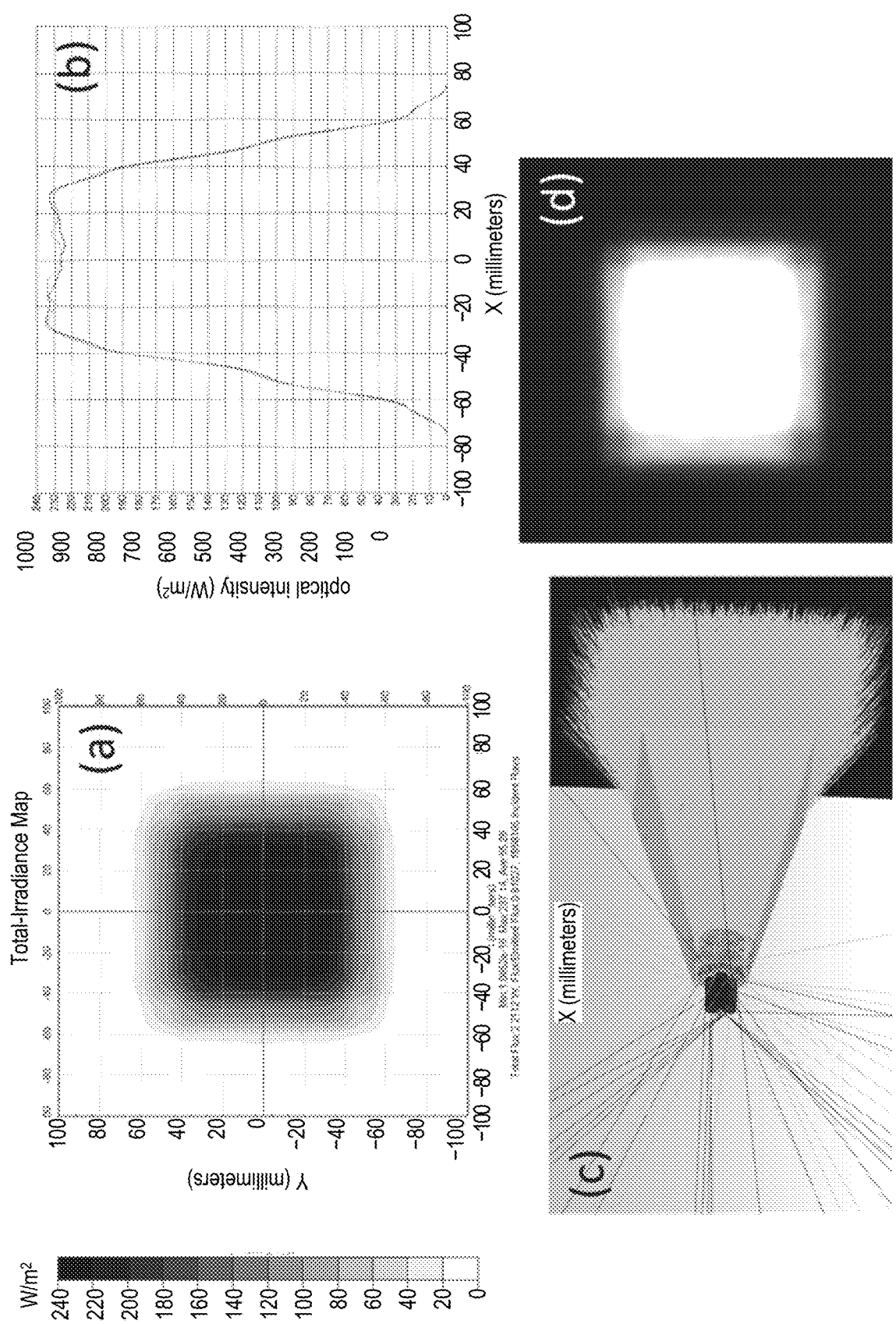

FIG. 11 illustrates true color and output efficiency vs. length of the mixing rod length and draft angle of the optical waveguide 170 as generated by TracePro® for an embodiment of lighting system 100, FIG. 1, where optical waveguide 170 is hollow. FIG. 12 shows (a) an irradiance map, and (b) optical intensity distribution in the horizontal and vertical directions, (c) ray tracing, and (d) true color at distal end 178 as generated by TracePro® for lighting system 500 of FIG. 5. Blue rays, green rays, and red rays correspond to respective power-density ranges of 0-0.33, 0.34-0.66, and 0.67-1.0.

In the embodiment of lighting system 100 simulated to produce results shown in FIG. 7, optical waveguide 170 was tapered hollow rectangle prism with a length of 100 mm, internal entrance size of 24 mm×24 mm, internal exit size of 42 mm×42 mm, a draft angle of 5 degrees and wall thickness of 1mm. The internal wall of the optical waveguide 170 has mirror-like surfaces with a spectral reflectivity of 90%. Diffuser rod 140 was thirty-millimeters long cylinder, had a ten-millimeter radius, and was embedded completely in optical waveguide 170 from proximal end 176. The surfaces of its sidewall and bottom are assumed to have a diffuse transmittance of 90%.

In the simulation of FIG. 7, light sources 120 include two red lasers (operating wavelengths 638 nm and 660 nm), one green laser (operating wavelength 520 nm), and one blue laser (operating wavelength 450 nm), which include Ø 5.6 mm TO (transistor outline) can-packaged laser diodes and installed symmetrically on diffuser rod 140. The power ratios of the above-mentioned four lasers are 1:0.638:0.750: 0.341, respectively. Mixing of the four lasers results in an output efficiency of 74.6% and a color temperature of 5153 K. The full width at half maximum (FWHM) of the power density distribution is 50 mm (FWHM), and the spectral contrast is below human eye's detection (5%) for this specific example.

In the embodiment simulated to produce the plots of FIG. 8, optical waveguide 200 has a hexagonal-cross section. The hexagon's side length is 12 mm on the entrance side and 21 mm on the exit side for the internal dimension of the optical waveguide. Other components and parameters are the same as the corresponding embodiment in FIG. 7. The output efficiencies are similar, e.g., 74% for hexagonal cross-section vs. 74.6% for rectangle cross-section. The color temperatures of the mixed white light in the center of the exit side of the optical waveguide correspond to 5060 K for hexagonal cross-section and 5153 K for rectangle cross-section, respectively. The hexagonal cross section enables to concentrate light in the center of the optical waveguide with a FWHM of 40 mm, which is smaller than the 50-nm internal transverse width of the rectangular optical waveguide 170 simulated to produce the results of FIG. 7. Therefore, the choice of the waveguide cross section may tailor the optical intensity distribution profile of the mixed white light output while maintaining the output efficiency and color temperature.

The embodiment simulated to produce the plots of FIG. 9 is similar to the embodiment used for FIG. 8, except that the internal wall of the optical waveguide 170 has a white diffuse coating with a diffuse reflectivity greater than 90% instead of mirror-like spectral reflectivity of 90%. The white diffuse coating results in a lower output efficiency (50%) because a fraction of the light escapes from the entrance side or some fraction of light is trapped in the optical waveguide 170. However, the white diffuse coating renders more multiple scatterings within optical waveguide 170 to achieve better color-mixing and homogenization. Specifically, FWHM of the power density distribution is 50 mm, as shown in FIG. 9(b). Accordingly, the radius of the white spot in the true color map FIG. 9(c) is larger in the white-diffuse coating case. The color-temperature distribution is more uniform in FIG. 9(d), compared to FIG. 8(d).

To further investigate the influence of the interior surface coating of the optical waveguide 170, FIG. 10 compares the power per length distribution as a function of the optical path length in the case of mirror-like coating (FIG. 8) and white diffuse coating (FIG. 9). A white diffuse coating enables more multiple scattering and extends the optical path length to a longer range, e.g., 1000 mm at 0.1 mW/mm vs. 600 mm at the same power per length for a mirror-like coating.

FIG. 11 compares the true color and output efficiency of the color-mixed laser white lighting vs. the rod length and the optical-waveguide draft angle in embodiments of lighting system 100, FIG. 1. Parameters used for the simulation of this specific embodiment are as follows. Optical waveguide 170 was a tapered rectangular hollow prism, ten centimeters in length, and having a 20 mm×20 mm aperture at proximal end 176. Light sources 120 include two red lasers (638 nm and 660 nm), one green laser (520 nm), and one blue laser (450 nm), which are Ø 5.6 mm TO canpackaged and installed symmetrically on diffuser rod 140. The power ratios of the above-mentioned four lasers are 1:0.638:0.750:0.341. In the simulation, diffuser rod 140 was cylindrical with a radius of 10 mm, and was completely embedded in optical waveguide 170. The sidewall and bottom surfaces of diffuser rod 140 were modeled to have a diffuse transmittance of 90%.

The large draft angle of the optical waveguide corresponds to a large exit port size. Specifically, a draft angle of 20° exhibits a large light spot and a high output efficiency (>80%), however, the mixing effect is very poor. A small draft angle presents a more uniform color-mixing and a smaller output light spot, e.g., a circular spot for a 5° draft angle, though the output efficiency decreases with smaller draft angles.

The length of the mixing rod affects the output efficiency slightly, e.g., length of 20 mm renders a higher output efficiency. The smaller mixing rod reveals a relative clear edge of the output light spot, and the larger mixing rod produces a blurry edge. Therefore, the overall mixing effect and output efficiency may be optimized the mixing rod length and the optical-waveguide draft angle.

Figure 13:
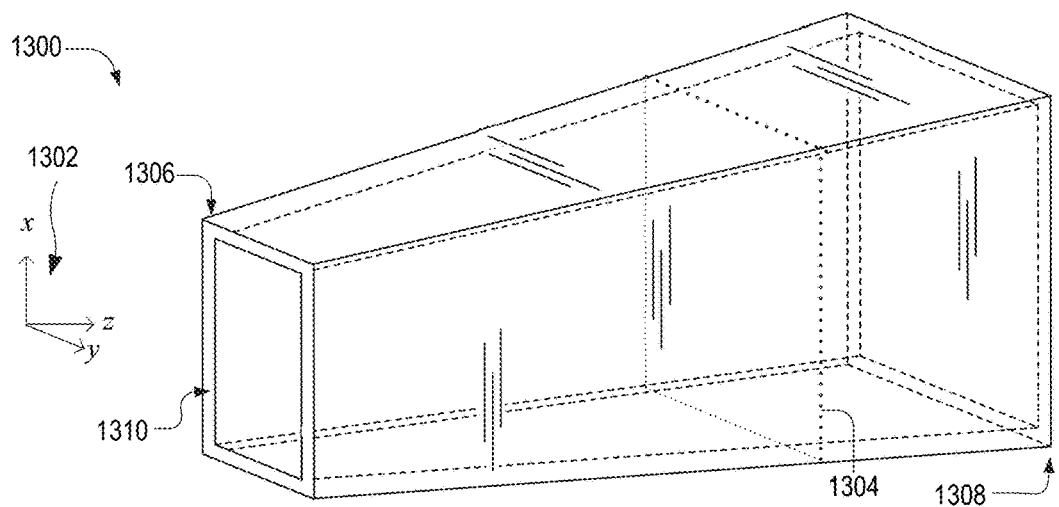
FIGS. 13-15 are schematics of an optical waveguide of a speckle-suppressing lighting system, in an embodiment.

FIG. 13 is a schematic of an optical waveguide 1300, examples of which include optical waveguides 170, FIGS. 1, 270, and 370, FIG. 3. FIG. 13 includes a coordinate axis 1302 formed by orthogonal axes x, y, and z. Optical waveguide 1300 includes a proximal base-surface 1310, an outer lateral-surface 1330, and a distal base-surface 1340. Outer lateral-surface 1330 spans between base-surfaces 1310 and 1340. At least one surface 1310 and 1340 is parallel to the x-y plane. Outer lateral-surface 1330 is between proximal base-surface 1310 and distal base-surface 1340.

Herein, an optical waveguide refers to a medium having physical boundaries that confine and direct propagating electromagnetic waves. An optical waveguide may be a hollow material medium having an aperture therethrough or cavity therein, or a "solid" material medium, which lacks such an aperture or a cavity.

Figure 14:
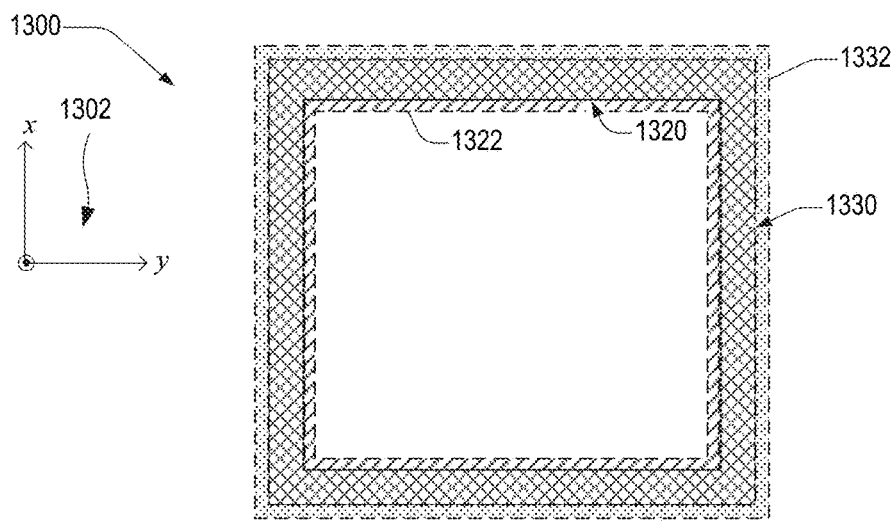
Figure 15:
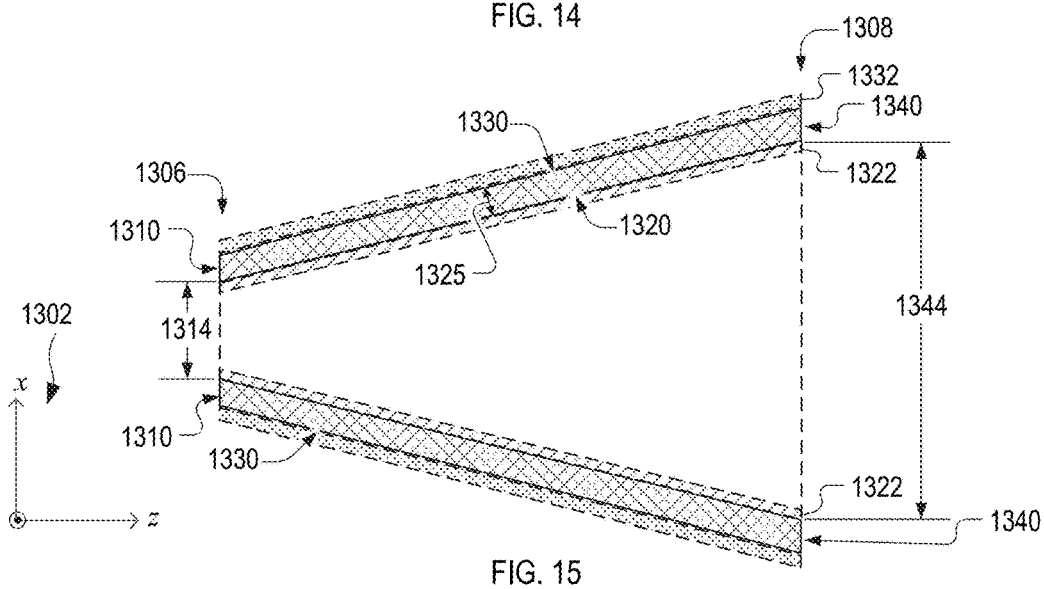

Optical waveguide 1300 has a proximal end 1306 and a distal end 1308, which may be at least partially defined by proximal base-surface 1310 and distal-base surface 1340, respectively. FIG. 13 denotes a transverse cross-sectional plane 1304, which is between proximal base-surface 1310 and distal base-surface 1340 along the z axis, and in a plane parallel to the x-y plane. FIG. 14 is a cross-sectional view of optical waveguide 1300 in plane 1304. FIG. 15 is a longitudinal cross-sectional view of optical waveguide 1300 in a plane parallel to the x-z plane. FIGS. 13-15 are best viewed together in the following description.

The cross-sectional plane of FIG. 15 intersects basesurfaces 1310 and 1340, and opposite sides of outer lateralsurface 1330. Herein, a transverse planes and cross-sections are parallel to the x-y plane, and a longitudinal planes and cross-sections are parallel to the x-z plane. FIGS. 13-15 are best viewed together in the following description.

In embodiments, optical waveguide 1300 is hollow, and includes an inner lateral-surface 1320, which also spans between base-surface 1310 and distal base-surface 1340. The cross-sectional plane of FIG. 15 intersects opposite sides of inner lateral-surface 1320. Inner lateral-surface 1320 may define either an aperture that extends through base-surfaces 1310 and 1340. In embodiments, base surface 1310 and inner lateral-surface 1320 together form a concave surface that defines a cavity of optical waveguide 1310. FIG. 15 denotes a thickness 1325 of material that forms optical waveguide 1300 between surfaces 1320 and 1330. In embodiments, thickness 1325 is between one millimeter and ten centimeters. optical waveguide 1300 may be formed of a polymer, a plastic, a ceramic, a composite, a metal, and any combination thereof.

When optical waveguide 1300 is hollow, each of basesurfaces 1310 and 1340 is an annular surface between inner lateral-surface 1320 and outer lateral-surface 1330. In crosssectional plane 1304, the shape of inner lateral-surface 1320 may be one one of circular, elliptical, polygonal, and any combination thereof. In the example of FIG. 14, this shape is rectangular. In embodiments, the shape of inner lateralsurface 1320 changes as a function of distance along the z axis from proximal base-surface 1310. For example, the shape may be circular at base-surface 1310, polygonal (e.g., square) at base-surface 1340, and gradually change from circular to polygonal at locations therebetween.

Optical waveguide 1300 may include at least one of (i) a reflective coating 1322 on inner lateral-surface 1320 and (ii) a reflective coating 1332 on outer lateral-surface 1330. Each of reflective coating 1322 and 1332 may be at least partially between base-surfaces 1310 and 1340. Reflective coating 1332 is an interior-facing reflective surface, such that light incident on coating 1332 from within optical waveguide 1300 reflects back into optical waveguide 1300.

Reflective coating 1322 may be a specular (e.g., (mirrorlike)) reflective coating, a diffuse (e.g., non-specular) reflective coating, or include a combination thereof. For example, reflective coating 1322 may include a specularly reflective coating and a diffuse reflective coating thereon to enhance light scattering. Examples of specular reflective coatings include metal coatings (e.g., aluminum, gold, silver, or combinations thereof) and multilayer dielectric coatings. The diffuse reflective coating may be a white diffuse coating.

Optical waveguide 1300 has an input width 1314 ($W_{1314}$) and an output width 1344 ($W_{1344}$). Output width 1344 may exceed input width 1314 such that the optical waveguide 1300 has a tapered cross-section in the x-z plane. The tangent of the draft angle of optical waveguide 1300 is defined as $|W_{1314}-W_{1344}|/(2L)$, where L is the length of optical waveguide 1300. This draft angle may be between zero and forty-five degrees.

In embodiments, a shape of the optical waveguide 1300 is a frustum, such that outer lateral-surface 1330 includes at least three trapezoidal lateral-surfaces spanning between least one surfaces 1310 and 1340. In the example of FIG. 13, outer lateral-surface 1330 includes four trapezoidal surfaces.

Without departing from the scope hereof, optical waveguide 1300 is solid, and hence not hollow, and therefore does not include inner lateral-surface 1320. Optical waveguide 1300 is illustrated as hollow in FIG. 13 and subsequent figures.

Figure 16:
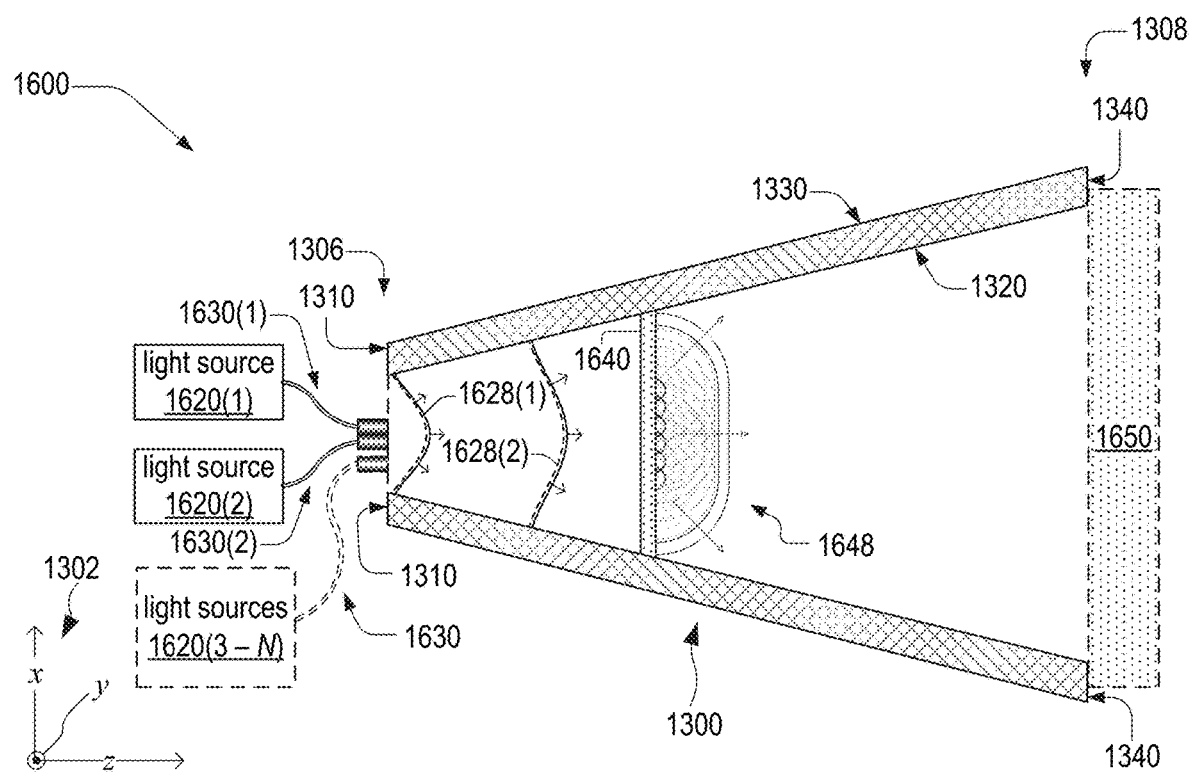
FIG. 16 is a schematic of a speckle-suppressing lighting system that includes that optical waveguide of FIG. 13, in an embodiment.

FIG. 16 is a schematic of a speckle-suppressing lighting system 1600, which includes optical waveguide 1300, solid-state light sources 1620(1) and 1620(2), and a diffuser 1640. Light source 120, FIG. 1, is an example of a light sources 1620. Each of diffuser rod 140, diffuser-plate array 440, and diffuser plate 442 is an example of diffuser 1640.

Solid-state light sources 1620(1) and 1620(2) are optically coupled to optical waveguide 1300 near proximal end 1306 and emit respective light beams 1628(1) and 1628(2), which propagate toward distal end 1308. Light beams 1628(1) and 1628(2) have, respectively, a first center wavelength and a second center length that differs from the first center wavelength. In embodiments, light beams 1628 reflect multiple times from the inner sidewalls of optical waveguide 1300 (e.g., lateral-surface 1320 or reflective coating 1322), and exit optical waveguide 1300 at distal surface 1308 white-light output.

Speckle-suppressing lighting system 1600 may include additional light sources 1620(3–N), where N≥3 and each light source 1620 has a different center wavelength. Each light source 1620 may be a laser. In embodiments, lighting system 1600 includes light sources 1620(1), 1620(2), and 1620(3), which emit red, green, and blue light, respectively.

Diffuser 1640 may include: at least one diffuser plate, at least one a diffuser rod, at least one phosphor plate, at least one phosphor rod, or any combination thereof. For example, diffuser 1640 may include a diffusor rod and an array of diffuser plates attached to one of the base surfaces of diffuser 1640. The phosphor plate and rod may include phosphor particles in the size range of one nanometer to ten micrometers. Diffuser 1640 may be a phosphor plate may be combined with a diffuser plate and indicated commonly as "diffuser/phosphor plate." In embodiments, a transverse cross section of diffuser 1640 is one of circular, elliptical, and polygonal, and any combination thereof, and may match the cross-sectional shape of optical waveguide 1300. Examples of diffuser 1640 include diffuser rod 140, a diffuser plate 442, diffuser-plate array 440, and optical elements with rough surfaces and/or embedded nanoparticles for strong diffusing and scattering.

At least part of diffuser 1640 is between proximal end 1306 and distal end 1308. For example, in lighting systems 100 and 200, diffuser rod 140 is entirely within respective optical waveguides 170 and 270, while in lighting systems 500, FIGS. 5, and 600, FIG. 6, part of diffuser rod 140 protrudes from optical waveguide 170. A longitudinal axis of diffuser 1640 may be parallel to a longitudinal axis of optical waveguide 1300.

Diffuser 1640 may have diffusing surface fabricated by roughening with sandpaper or coated/capped with a diffuser layer. Diffuser 1640 may include luminescent or non-luminescent particles (with a size range between nanometer-scale and micrometer-scale) embedded therein, where the particles function as bulk scattering centers. In embodiments, diffuser 1640 is formed of acrylic, glass, ceramic, or a combination thereof. In embodiments, the mixing diffuser rod is fused with laser light guides to form a compact structure.

Diffuser 1640 diffuses light beams 1628 as they propagate toward distal end 1308. For example, light beams 1628 exit diffuser 1640 as a homogenized beam 1648. Homogenized beam 1648 is polychromatic, as it includes at least the first and second center wavelengths. FIG. 16 illustrates homogenized beam as a plurality of wavelets emanating from a surface of diffuser 1640 that faces distal end 1308.

Speckle-suppressing lighting system 1600 may include at least one optical element 1650 on distal base-surface 1340. Optical elements 1650 may improve homogeneity, lower speckle contrast, desirable correlated color temperature (CCT), and color rendering index (CRI). Optical element 1650 may span across the aperture through optical waveguide 1300 defined by inner lateral-surface 1320. Examples of optical element 1650 include diffuser plate 352 and TIR lens 354.

When optical element 1650 is a TIR lens, light beams 1628 undergo multiple diffusion, scattering and mixing before exiting the reflective/diffusive optical waveguide to generate homogeneous, speckle-suppressed white light.

In embodiments, speckle-suppressing lighting system 1600 includes at least one light-coupling element 1630 that couples solid-state light source 1620 to optical waveguide 1300 (at proximal end 1306) or to diffuser 1640. For example, speckle-suppressing lighting system 1600 may include at least one of light-coupling elements 1630(1) and 1630(2), which couple respective solid-state light source 1620(1) and 1620(2) to optical waveguide 1300 or diffuser 1640. When speckle-suppressing lighting system 1600 includes light sources 1620(3–N), speckle-suppressing lighting system 1600 may include additional light-coupling elements 1630 that each couple a respective light source light sources 1620(3–N) to optical waveguide 1300.

Light-coupling element 1630 may include an optical waveguide, such as a light pipe or an optical fiber, and a lens, such as an aspheric lens or a graded-index lens. The optical fiber allows spatial separation, and hence thermal isolation, of optical waveguide 1300 from light sources 1620. In embodiments, diffuser 1640 and at least part of each light-coupling element 1630 may be a single optical element, e.g., by being integrally formed or fused together.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A speckle-suppressing lighting system comprising:
   an optical waveguide having a proximal end, a distal end, and being a solid volume of material having a proximal base surface, a distal base surface, an outer lateral-surface therebetween;
   a first solid-state light source, optically coupled to the optical waveguide near the proximal end, that emits a first light beam that propagates toward the distal end and has a first center wavelength;
   a second solid-state light source, optically coupled to the optical waveguide near the proximal end, that emits a second light beam that propagates toward the distal end and has a second center wavelength differing from the first center wavelength;
   a diffuser, at least part of which is between the proximal end and the distal end, that diffuses the first light beam and the second light beam; and an interior-facing diffuse reflective coating on the outer lateral-surface.

2. The speckle-suppressing lighting system of claim 1, at least one of the first solid-state light source and the second solid-state light source being a laser.

3. The speckle-suppressing lighting system of claim 1, a shape of the optical waveguide being a frustum that includes at least three trapezoidal lateral-surfaces spanning between the proximal end and the distal end.

4. The speckle-suppressing lighting system of claim 1, the diffuser being a diffuser rod.

5. The speckle-suppressing lighting system of claim 1, the diffuser including multiple diffuser plates.

6. The speckle-suppressing lighting system of claim 1, the distal end being a distal surface of the optical waveguide, the speckle-suppressing lighting system further comprising a diffuser plate on the distal surface.

7. The speckle-suppressing lighting system of claim 1, the distal end being a distal surface of the optical waveguide, the speckle-suppressing lighting system further comprising a total-internal-reflection lens on the distal surface.

8. The speckle-suppressing lighting system of claim 1, further comprising at least one of (i) a first optical waveguide that couples the first solid-state light source to the proximal end, and (ii) a second optical waveguide that couples the second solid-state light source to the proximal end.

9. The speckle-suppressing lighting system of claim 8, each of the first optical waveguide and the second optical waveguide being an optical fiber.

10. The speckle-suppressing lighting system of claim 8, each of the first optical waveguide and the second optical waveguide being a light pipe.

11. A speckle-suppressing lighting system comprising:
an optical waveguide that (i) has a proximal end and a distal end that includes a distal surface of the optical waveguide and (ii) is hollow and includes an inner lateral-surface that spans between the proximal end and the distal end, and defines an aperture in the proximal end and the distal end;
a reflective coating on the inner lateral-surface;
a total-internal-reflection lens on the distal surface;
a first solid-state light source, optically coupled to the optical waveguide near the proximal end, that emits a first light beam that propagates toward the distal end and has a first center wavelength;
a second solid-state light source, optically coupled to the optical waveguide near the proximal end, that emits a second light beam that propagates toward the distal end and has a second center wavelength differing from the first center wavelength; and
a diffuser, at least part of which is between the proximal end and the distal end, that diffuses the first light beam and the second light beam.

12. The speckle-suppressing lighting system of claim 11, the optical waveguide including an outer lateral-surface that spans between the proximal end and the distal end, the proximal end and the distal end being, respectively, a first annular surface and a second annular surface between the inner lateral-surface and the outer lateral-surface.

13. The speckle-suppressing lighting system of claim 11, in a cross-sectional plane through both the inner lateral-surface and parallel to a plane of one of the proximal end or the distal end, a shape of the inner lateral-surface being one of circular, elliptical, polygonal, and any combination thereof.

14. The speckle-suppressing lighting system of claim 11, an output width of the distal end exceeding an input width of the proximal end such that the optical waveguide has a tapered cross-section in a cross-sectional plane that intersects the proximal end, the distal end, and opposite sides of the inner lateral-surface.

* * * * *